R. McFARLAND.
SPRING WHEEL.
APPLICATION FILED JAN. 21, 1908.
930,557.
Patented Aug. 10, 1909.
2 SHEETS—SHEET 2.
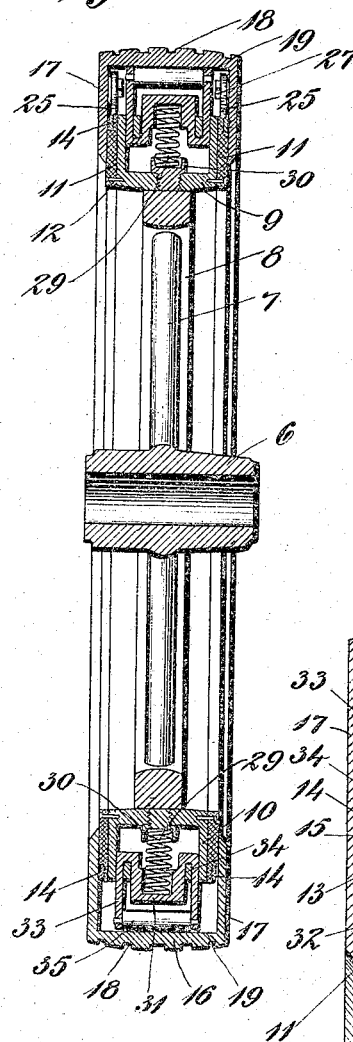
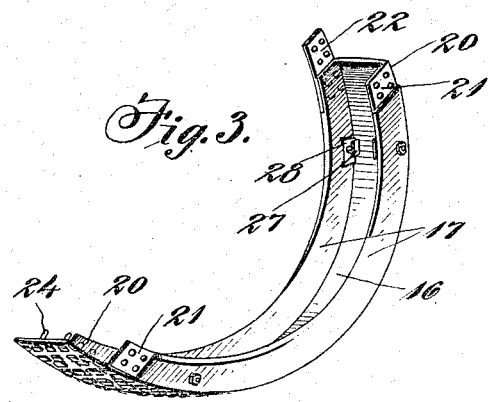
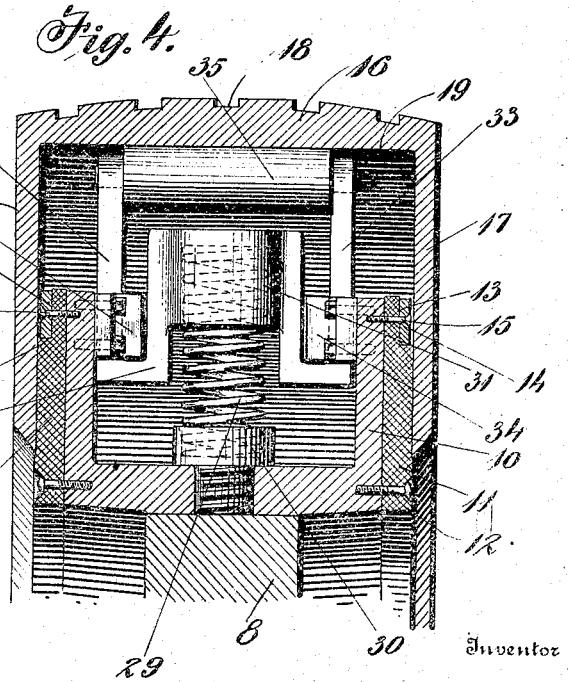

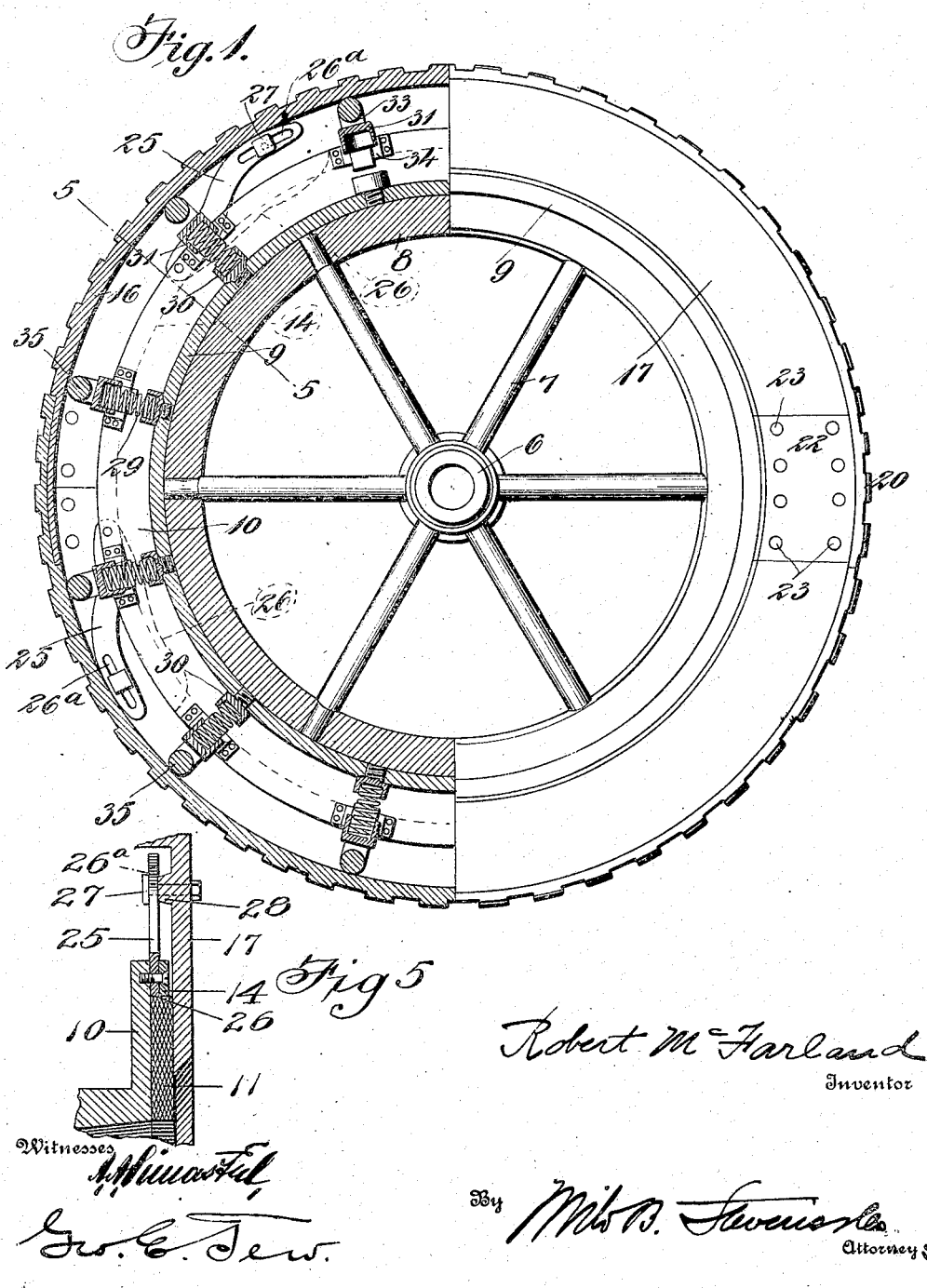

UNITED STATES PATENT OFFICE.

ROBERT McFARLAND, OF TATESVILLE, PENNSYLVANIA.

SPRING-WHEEL.

No. 930,557.

Specification of Letters Patent.

Patented Aug. 10, 1909.

Application filed January 21, 1908. Serial No. 411,884.

*To all whom it may concern:*

Be it known that I, ROBERT MCFARLAND, a citizen of the United States, residing at Tatesville, in the county of Bedford and State of Pennsylvania, have invented certain new and useful Improvements in Spring-Wheels, of which the following is a specification.

This invention relates to spring wheels, and has for its object to form an improved resilient wheel without the use of a rubber or pneumatic tire.

Pneumatic tires are subject to many well known objections, among which are their liability to puncture and their lack of durability.

In the present invention metallic springs are used in the body of the tire, or between the rim and the tire, and the springs will yield to the necessary extent to produce a resilient wheel having the advantages of a pneumatic tire without the defects thereof.

The invention comprises improved means for associating and holding together the rim and the tire, as said parts will hereafter be called, and also for holding the spring therebetween, in such a manner that they are operative freely for the intended purpose. Improved means are also provided, in connection with the tire, for preventing skidding or side slipping of the wheel, and to sustain the traction thereof, the wheel being particularly adapted for use on motor vehicles.

Other improvements and advantages will be apparent from the following description and the accompanying drawings.

In the drawings, Figure 1 is a side elevation of the wheel, in half section. Fig. 2 is a central cross section. Fig. 3 is a perspective view of one of the rim sections, showing the inside thereof. Fig. 4 is an enlarged detail of one of the frames which bear upon the springs, between the rim and the tire. Fig. 5 is a detail in section on the line 5—5 of Fig. 1.

The central part of the wheel may be of any desired or suitable construction. As shown, it comprises a hub 6, spokes 7 and a felly 8, which may be made of wood. The felly receives a metal rim, which may be shrunk on or otherwise secured, and is preferably made of steel, in connection with fiber rings, as hereinafter explained. The main or metal part of the rim has the form or section of a channel, the base 9 of which fits the felly and the flanges 10 of which project outwardly at each edge. This may be conveniently pressed or cast from steel, in one piece. Extending around each flange, on the outer side thereof, is a ring of fiber indicated at 11 which is screwed to the flanges as at 12. This fiber receives the friction or pressure of the adjacent flanges of the tire, to be hereinafter described; and serves to prevent noise and rattling and to give a good wearing surface. At its outer edge the fiber ring is rabbeted as indicated at 13 to receive a steel strengthening ring 14 suitably secured as by screws 15 extending through the ring, the fiber, and the rim flange. The tire, proper, also consists of channeled metal, with the flanges projecting inwardly. It is divided on a diametrical line, into two parts or sections, so that it may be readily removed or replaced. Each section has a tread 16 and inwardly projecting flanges 17, and when the sections are joined at the ends they form a complete rim. The tread surface is rounded as shown at 18, but on the inside is straight, as at 19. The sections are halved and lapped at the ends of the tread, as shown at 20. The side flanges are halved or reduced and butted, as indicated at 21, and are joined by plates 22 which cover the joint and which are secured by a sufficient number of bolts 23. The splices at 20 are connected by bolts 24, the heads of which are preferably squared and project as shown, to prevent skidding or slipping; and it may be here stated that similar heads are used all around the surface of the tire, being arranged in several rows, for the said purpose. The bolts at the splices have the additional function of uniting the splices. This tire, so constructed, fits over or outside of the rim above described, with the flanges of the tire in working contact with the fiber rings 11, and the tire and rim form an annular chamber or space therebetween which contains the resilient devices.

In order to sustain the thrust or traction between the rim and the tire, they are connected by means of links 25 which are arranged in pairs around the rim. Each link is pivoted at its inner end by a pin which extends through the ring 14 and flange 10, and the inner end of the link fits in a recess 26 produced in the edge of the fiber piece 11. At the outer end the link is slotted, as indicated at 26ª, the slot in the end of the link being curved on the same center as the wheel. The pairs of links are arranged in alternately opposite directions, with respect to the circumference of the wheel, so that part thereof sustains thrust and the others sustain pull. They are connected to the tire by means of bolts 27 which extend through the slots 26ª, the bolts being formed with heads on the inner ends and a shoulder or thickened neck where they extend through the slots, so that the heads will be spaced from the flanges of the tire, and said flanges are strengthened by reinforcements 28 (see Fig. 3) where the bolts are screwed through the flanges. The bolts receive nuts on the outside to hold them in place. Four sets or pairs of links are used, and they are so positioned that the bolts will be located at equal distances apart, around the tire. When traction is put upon the wheel the central structure will turn until the bolts reach the ends of the slots, when the motion will be communicated to the tire, to drive the wheel. The pivotal connection of the links allows relative movement between the rim and the tire, incident to the compression or expansion of the springs therebetween.

The springs are indicated at 29, consisting of a series of coiled radial springs the inner ends of which are seated in cups or sockets 30 on the base 9 of the rim, and the outer ends of which are seated in sockets 31 each of which forms part of a frame which has inner side pieces 32 and outer side pieces 33 the latter of which work radially under guides 34 secured to the inner sides of the flanges 10 of the rim. The frame consisting of the parts 31, 32, and 33, is preferably made or cast in one piece, and the parts or arms 33 project beyond the edge of the rim flanges and carry rollers 35 which rest upon the inner surface 19 of the tire. The rollers are free to move upon the surface of the tire, to accommodate the spring action, to the extent demanded by the compression of the springs which are under weight, and as the springs are compressed and expanded the arms 33 work in and out in the guides 34, the rollers serving to decrease the friction and to prevent binding of the parts. The number of springs and associated frames may be varied as desired or necessary, according to the weight to be carried and the strength of the individual springs used. Under extreme pressure the inner ends of the arms 33 will stop against the base 9 of the rim, and so form a solid wheel at the point of pressure. The springs and working parts are inclosed in the space between the tire and rim, and inasmuch as the flanges of the tire fit closely against fiber pieces 11, a comparatively tight joint is formed which serves to keep out dirt and foreign matter and which makes a comparatively noiseless action.

In operation, the springs are compressed between the rim and the tire at the point where the latter sustains the weight, thereby allowing the tire, which is comparatively rigid, to assume a position slightly eccentric to the center of the wheel, and the action of the springs restores the tire to its position as the point of weight changes. Owing to the comparatively rigid construction of the tire and rim, the load is sustained by all the springs in the lower half of the rim, and consequently there is little tendency to strain or fracture any particular spring.

I claim:

1. The combination of a wheel having a channeled rim with outwardly projecting flanges and radial guides on the inner sides of said flanges, a tire extending around said rim, connections between the tire and rim, to stand traction strain, frames slidable radially in the guides and having bearings at their outer ends against the inner side of the tire, and springs between the frames and the rim.

2. The combination of a wheel having a rim with radial guides thereon, a tire extending around the rim, connections between the tire and rim, to stand traction strain, frames slidable radially in the guides and having rollers bearing on the inner side of the tire, and springs between the frames and the rim.

3. The combination of a wheel having a channeled rim with outwardly extending flanges, said flanges having radial guides on the inner sides, a rigid tire extending around the frames slidable in the guides and having rollers at their outer ends bearing upon the tire, and springs between the frames and the rim, the frames having inwardly extending parts on opposite sides of the springs adapted to stop against the rim at extreme compression of the springs.

In testimony whereof I affix my signature, in presence of two witnesses.

ROBERT McFARLAND.

Witnesses:
  MARY L. MORTON,
  GEO. E. TEW.